United States Patent [19]
Essa et al.

[11] Patent Number: 5,312,159
[45] Date of Patent: May 17, 1994

[54] SEAT BELT SASH

[76] Inventors: Fiona Essa, 930 Haves St. #4, San Francisco, Calif. 94117; Eric Flick, 1135 Cole St., San Francisco, Calif. 94117

[21] Appl. No.: 970,030

[22] Filed: Nov. 2, 1992

[51] Int. Cl.$^5$ ............................................. B60R 22/00
[52] U.S. Cl. ....................................... 297/482; 40/638
[58] Field of Search .......................... 40/630, 638, 299; 297/482; 280/808

[56] References Cited

U.S. PATENT DOCUMENTS

| | | | |
|---|---|---|---|
| 3,006,793 | 10/1961 | Wheeler, III | 40/630 |
| 3,153,869 | 10/1964 | Twentier | 40/633 |
| 3,957,282 | 5/1976 | Finnigan | 297/482 |
| 4,678,205 | 7/1987 | Wold | 280/808 |
| 4,693,495 | 9/1987 | LaPointe | 297/482 |
| 4,795,190 | 1/1989 | Weightman et al. | 297/482 |
| 4,958,853 | 9/1990 | Doty | 297/472 |
| 4,965,123 | 10/1990 | Swan et al. | 156/229 |
| 4,969,663 | 11/1990 | Nowacki | 280/808 |

FOREIGN PATENT DOCUMENTS

| | | | |
|---|---|---|---|
| 2436608 | 5/1980 | France | 297/482 |
| 2182838 | 5/1987 | United Kingdom | 297/482 |
| 0000064 | 10/1987 | World Int. Prop. O. | 297/482 |

Primary Examiner—Peter M. Cuomo
Assistant Examiner—Darnell M. Boucher
Attorney, Agent, or Firm—Cornelius J. Husar

[57] ABSTRACT

The present invention discloses a seat belt sash in the form of a decorative strip of acetate or like fabric which has a satin finish on its front surface and a pressure sensitive adhesive on its rear surface which is covered with a protective peel-off backing strip. The sash is affixed to the shoulder strap of an automotive seat belt with the decorative surface of the sash facing outwardly in view of the public. The sash has a printed message, pattern, or solid color thereon and serves to encourage the use of seat belts by automotive drivers and passengers while simultaneously allowing the user to present his message to the public. The seat belt sash is made to specific dimensions, i.e. width and thickness, to insure interference free use of the seat belt.

10 Claims, 3 Drawing Sheets

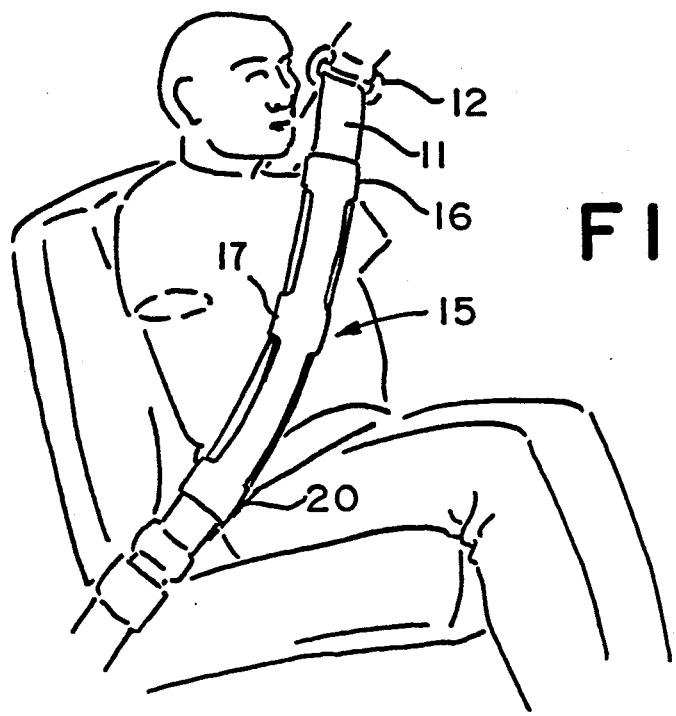
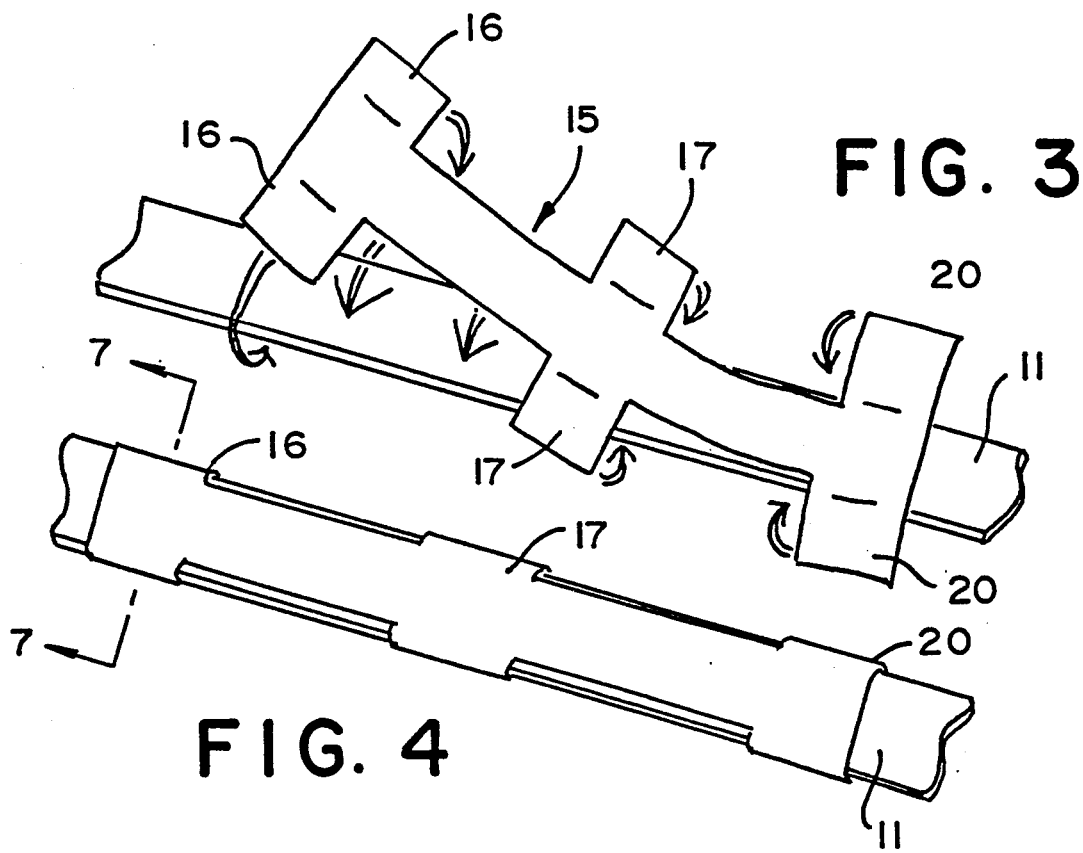

SEAT BELT SASH

BACKGROUND OF THE INVENTION

The present invention is directed to a decorative sash which is to be secured or affixed to the outer surface of the shoulder strap of an automotive seat belt.

More specifically, the sash is secured to the outer surface of the shoulder strap in such a manner as to allow the outer surface of the sash to be exposed. The sash is provided on its rear side with a peel-off strip thus exposing an adhesive layer which provides the means by which applicants' novel sash is secured to the seat belt shoulder strap.

In today's race for expressions of individualism through the individual's automobile, there have been many forms of personal attempts to express their preferences. These expressions have boasted alumni messages, football team preference, home state messages and many other similar messages for which individuals have a fondness or personal association therewith and wish to make these preferences known to the public at-large. These various messages come in a variety of forms such as bumper stickers or decals applied to the windows of their vehicles.

We are all familiar with the various messages presented to us in the form of "vanity" license plates. The subject of the instant invention is another form of such public expression and is attainable at a fraction of the cost of these "vanity plates".

Since people spend a great deal of time in their cars, they tend to treat their car as an extension of their personality. In addition to the types of cars they drive, people often add personalizations, as indicated above, to express their beliefs, associations, and tastes to other drivers of the motoring public. The seat belt sash will allow car owners to further decorate their vehicles with statements, patterns, or just a plain sash of a solid or striped color suitable to the user. The sash is made from a fabric, which is preferably acetate with a satin finish. This particular material is preferred to make the seat belt resemble the sash worn by beauty contestants to denote the geographical area they represent.

In addition to being a decorative item, the seat belt sash also serves as a strong encouragement for drivers and passengers to wear their seat belts. By having some sort of personal statement on the seat belt, drivers are encouraged to "buckle-up" their seat belts in order to display their personal message to other motorists and passengers thus promoting safety through seat belt wearing.

BRIEF DISCUSSION OF THE PRIOR ART

A search of the prior art has revealed the following patents, Spill U.S. Pat. No. 4,619,468; Wold U.S. Pat. No. 4,678,205; Weightman et al U.S. Pat. No. 4,741,574; and Nowacki U.S. Pat. No. 4,969,663. Each of the above cited patents discloses a device for use with a seat belt. A review of these patents indicates that their main thrust is to provide a measure of comfort to the user while wearing a seat belt. However, each of these patents suffers from the same deficiency, i.e. they are all bulky devices requiring the use of Velcro strips or snap fasteners for attachment. It can readily be seen that these devices, at the very least, present possible interference with the normal use of a seat belt. It was an awareness of these potential problems that motivated applicants to develop the novel seat belt sash set forth in the instant application.

SUMMARY OF THE INVENTION

The present invention provides decoration for the shoulder strap of an automotive seat belt. The seat belt sash takes the form of an acetate fabric having a satin outer finish with a pressure-sensitive adhesive backing which allows the sash to be easily affixed to the seat belt. The fabric strip is slightly narrower than the width of the seat belt shoulder strap and is provided with tab extensions at the upper, middle and lower portions thereof. The tabs are folded under the back side of the shoulder strap with one tab overlapping the other of each set of tabs. The decorative sash may be provided in various colors of a solid, striped, or patterned arrangement, it may also contain a personal message imprinted on a solid background. The personal message may be any one of the aforementioned messages of the user's choice.

BRIEF DESCRIPTION OF THE DRAWINGS

FIG. 2 is a perspective view of the seat belt sash fixedly secured to the shoulder strap worn by a vehicle occupant.

FIG. 3 is an illustration of the manner in which the seat belt sash is attached to the seat belt shoulder strap.

FIG. 4 is a close-up view of the seat belt sash attached to the seat belt shoulder strap.

DETAILED DESCRIPTION OF THE DRAWINGS

Figures 1, 1A:
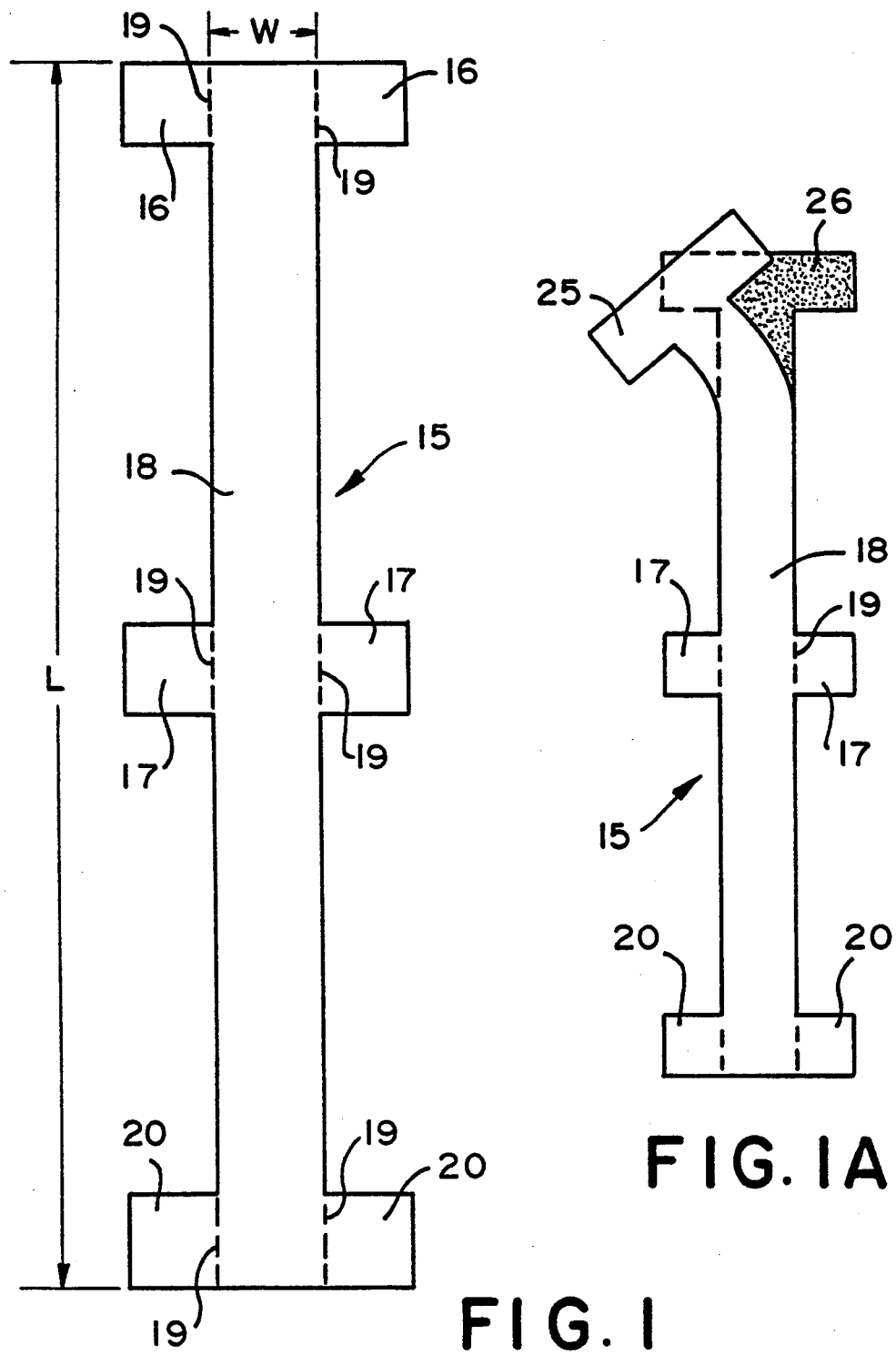
FIG. 1 is a plan view of the novel seat belt sash per se.
FIG. 1A is a plan view of the rear side of the seat belt sash showing the pressure adhesive when the backing strip is pulled back.

Referring now to FIG. 1, there is shown a plan view of the novel seat belt sash 15. As illustrated, seat belt sash 15 comprises an elongated central portion 18. The length of sash 15 which is designated "L", is approximately twenty one inches long. The width of sash 15 is approximately one and five eighths inches and is designated "W". Integral with elongated central portion 18 are a pair of upper tabs 16, middle tabs 17 and lower tabs 20. These tabs are used to provide additional securing means for attaching sash 15 to the shoulder strap 11 of a vehicle.

In the areas of tabs 16, 17 and 20 fold lines 19 are provided at the extension point of tabs 16, 17 and 20 from elongated central portion 18. The purpose of these fold lines 19 is to permit smooth bending of tabs 16, 17 and 20 without undesired creases in sash 15. The rear side of sash is provided over its entire surface with a pressure-sensitive adhesive 26 which is covered with a peel-off wax backing 25 that is peeled off to expose the pressure-sensitive adhesive 26 thereunder prior to affixing sash 15 to a shoulder strap 11.

Sash 15 is made from an acetate fabric, with a satin outer finish which may be of a solid color, striped or patterned, or contain an imprinted personal message on a solid background. Sash 15 is slightly narrower than the width of shoulder strap 11 and has a thickness of approximately 0.001 inches. By applying pressure to the front surface of sash 15 and the tab areas, it is readily secured to shoulder strap 11 and the fabric sash 15 becomes a part thereof. Due to the sash dimensions, i.e. width and thickness, the seat belt can be extended or retracted without interfering in any manner with the normal operation of shoulder strap 11. Tabs 16, 17 and 20 are folded back behind strap 11 with one end overlapping the other. These tabs provide additional securing means and serve to prevent sash 15 from peeling off after an extended period of repeated seat belt use. Sash 15 is applied to shoulder strap 11 with a person seated in the position shown with the seat belt 10 secured in its normal position. The assistance of another person would be desirable to insure proper placement of sash 15, although such assistance is not absolutely required. When properly attached, sash 15, due to its dimensions and manner of attachment, does not interfere with the extension or retraction of seat belt shoulder strap 11.

FIG. 1A is a reduced illustration of the back side of sash 15. As shown, peel-off backing strip 25 has been peeled back at the upper end thus exposing pressure-sensitive adhesive 26.

Referring now to FIG. 2, there is an illustration of sash 15 securely fastened to shoulder strap 11. As illustrated, tabs 16, 17 and 20 have been folded rearward behind shoulder strap 11 and affixed to shoulder strap 11 by applying pressure to front and rear of sash 15 in these areas. As shown, sash 15 is slightly narrower than the width of shoulder strap 11 to prevent fraying or peeling of sash 15 from shoulder strap 15. It is to be noted that the increased width in the areas of tabs 16, 17 and 20 is of no consequence with regard to interference during the extension or retraction of shoulder strap 11 through belt guide 12 since there is sufficient clearance to allow trouble-free passage of shoulder strap 11 therethrough.

FIG. 3 is an illustration of the manner of affixing sash 15 to shoulder strap 11. After removal of the peel-off backing strip, (not shown in this view) the pressure-sensitive adhesive 26 on the back side of sash 15 is exposed. The manner of attachment of sash 15 is quite easy as illustrated in FIG. 2. Sash 15 is centered in the desired location and then, by folding back tabs 20, 17 and 16, pressing one end of the tabs to shoulder strap 11 and then overlapping the first tab with the second tab and applying compressive pressure to the front and rear faces of sash 15 in the area of the tabs will provide a secure attachment. Next, the area between lower tabs 20 and middle tabs 17 would be affixed to shoulder strap 14 by applying a compressive force in this area. Care should be exercised to ensure that sash 15 is applied without any wrinkles or air pockets between sash 15 and shoulder strap 11. After securing middle tabs 17 in the manner described relative to tabs 20, the sash portion between middle tabs 17 and upper tabs 16 is affixed followed by the securement of upper tabs 16.

FIG. 4 is an enlarged close-up view illustrating sash 15 after the attachment procedure outlined immediately above has been performed.

Figure 5:
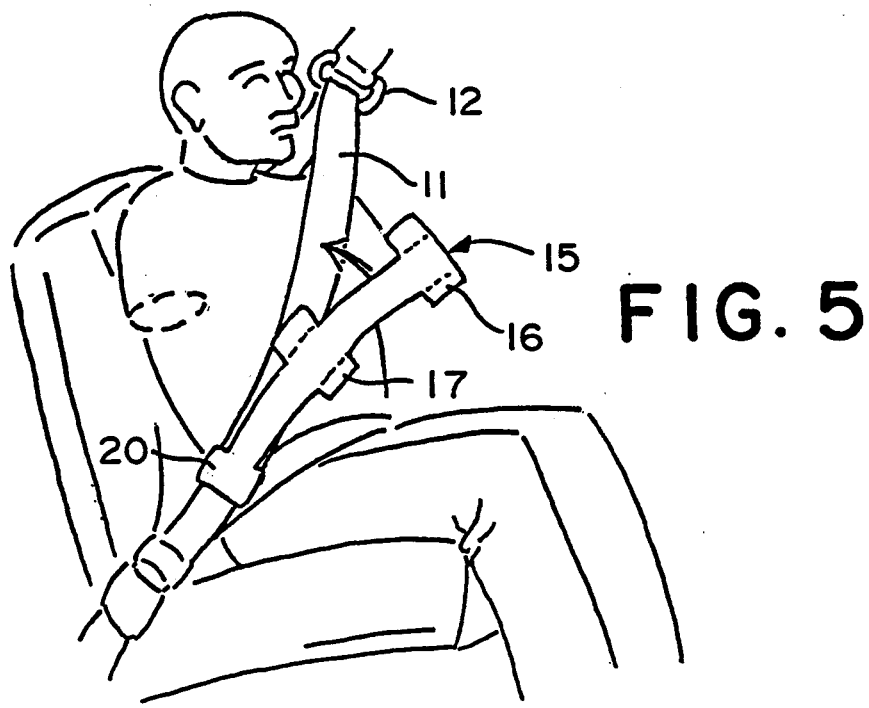
FIG. 5 is a perspective view illustrating the manner of attaching the seat belt sash to the seat belt shoulder strap as it is worn.

FIG. 5 is an illustration somewhat similar to FIG. 2, however this view shows lower tabs 20 secured with an arrow showing the direction of placement of sash 15 prior to securement of middle tabs 17 and upper tabs 16.

Figure 6:
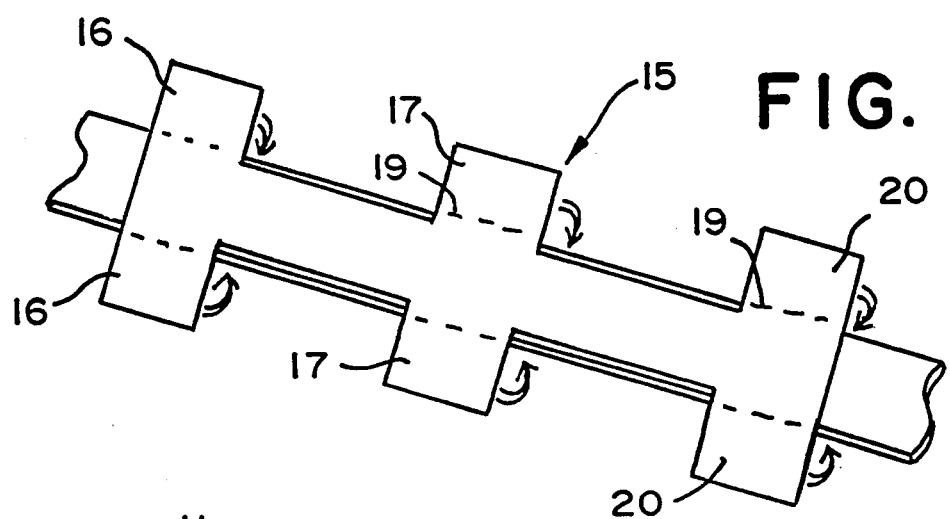
FIG. 6 is an illustration of the positioning of the seat belt sash relative to the seat belt shoulder strap before the tabs are folded rearward.

FIG. 6 is another illustration indicating the directional movement of tabs 16, 17 and 20 in the attachment procedure.

Figure 7:
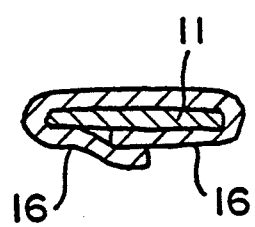
FIG. 7 is a cross-sectional view taken along the line 7—7 of FIG. 4, illustrating the tab overlap.

FIG. 7 is a sectional view taken along line 7—7 of FIG. 4. This view clearly illustrates the manner of overlapping tabs 16 relative to shoulder strap 11.

Figure 8:
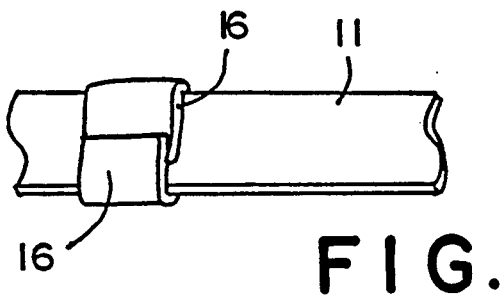
FIG. 8 is a perspective view of the back side of the shoulder strap illustrating the overlap of the seat belt sash tabs after securement.

FIG. 8 is a view of the back side of shoulder strap 11 again illustrating the overlapping of tabs 16.

As can be seen from the above discussion, applicants have provided a means by which the motoring public can express their opinions, preferences, beliefs or any other message to the public at-large. Although reference thus far has only been directed toward adult use of seat belts incorporating the novel sash 15. The possibilities are almost endless when one considers the millions of children that are transported daily by parents to various functions beginning with early morning trips to school or trips to the baby sitter and ending with up with an evening ride home from the library, movie, or after school activities. Various messages, favorite comic characters, etc. would be a great motivation for the younger travelers to "buckle-up".

While the invention has been described in its preferred embodiments, it is to be understood that the words which have been used are words of description rather than limitation and that changes may be made within the purview of the appended claims without departing from the full scope or spirit of the invention.

Having thus described our invention,

We claim:

1. The combination of a vehicle passive restraint system including a shoulder strap with a seat belt guide and a decorative sash to display any desired message thereon, said decorative sash comprising:

a front surface, a rear surface and an elongated central message portion;

first and second means for securing said decorative sash to said shoulder strap;

said first means for securing said decorative sash comprising a pressure-sensitive adhesive over the entire rear surface and a peel-off backing strip over the entire adhesive coated rear surface of said sash;

said second means for securing said decorative sash to said shoulder strap comprising a plurality of tabs integral with and extending outwardly from said elongated central portion at predetermined spaced locations thereof;

wherein upon peeling off said backing strip, and applying pressure to the frontal area of said decorative sash said first securing means is effected and by bending said tabs rearward in overlapping fashion said second securing means is effected securely attaching said sash to the shoulder strap of a seat belt;

said decorative sash having a width which is less than the width of said shoulder strap and a thickness which allows free passage of both the shoulder strap and the decorative sash through the seat belt guide.

2. A decorative sash as defined in claim 1 wherein said plurality of tabs comprises six tabs with three tabs extending outwardly from each side of said elongated central message portion.

3. A decorative sash as defined in claim 2 wherein said predetermined locations are the upper, middle and bottom portions of said elongated central message portion.

4. A decorative sash as defined in claim 1 wherein the overall length of said elongated central message portion is approximately twenty one inches.

5. A decorative sash as defined in claim 1 wherein said central message portion includes an artistic design imprinted thereon.

6. The combination of an automotive seat belt restraint system and a decorative sash securely attached thereto;

said automotive seat belt restraint system including a shoulder strap and guide means for holding said shoulder strap in proper position over the user's shoulder;

said decorative sash having a front surface, a rear surface and an elongated central message portion;

a plurality of tabs integral with and extending outwardly from said elongated central message portion at predetermined locations thereof;

said elongated central message portion and said plurality of tabs having a satin outer finish and a pressure-sensitive adhesive over the entire rear surface with a protective peel-off backing strip thereover;

said decorative sash having a width which is less than the width of said shoulder strap over the entire length thereof except for the areas of said plurality of tabs;

wherein by removing said peel-off backing strip, said pressure-sensitive adhesive is exposed and by carefully positioning said decorative sash relative to said shoulder strap and applying frontal pressure, said elongated central message portion is secured to said shoulder strap and by bending said tabs rearwardly in overlapping fashion and applying pressure thereto said decorative sash is completely attached to said shoulder strap;

said areas of said tabs having an overall width which allows said shoulder strap and sash to be extended and retracted through the guide means without any binding or interference.

7. The combination of an automotive seat belt restraint system and a decorative sash as defined in claim 6 wherein said plurality of tabs comprises six tabs with three of said tabs extending outwardly from each side of said elongated central message portion.

8. The combination of an automotive seat belt restraint system and a decorative sash as defined in claim 7 wherein said predetermined locations are the upper, middle, and bottom portions of said elongated central message portion.

9. The combination of an automotive seat belt restraint system and a decorative sash as defined in claim 6 wherein the overall length of said elongated central message portion is approximately twenty one inches.

10. The combination of an automotive seat belt restraint system and a decorative sash as defined in claim 6 wherein said central message portion includes an artistic design imprinted thereon.

* * * * *